Oct. 15, 1929.  E. R. RYDER  1,731,323
LIQUID METER
Filed Feb. 24, 1928
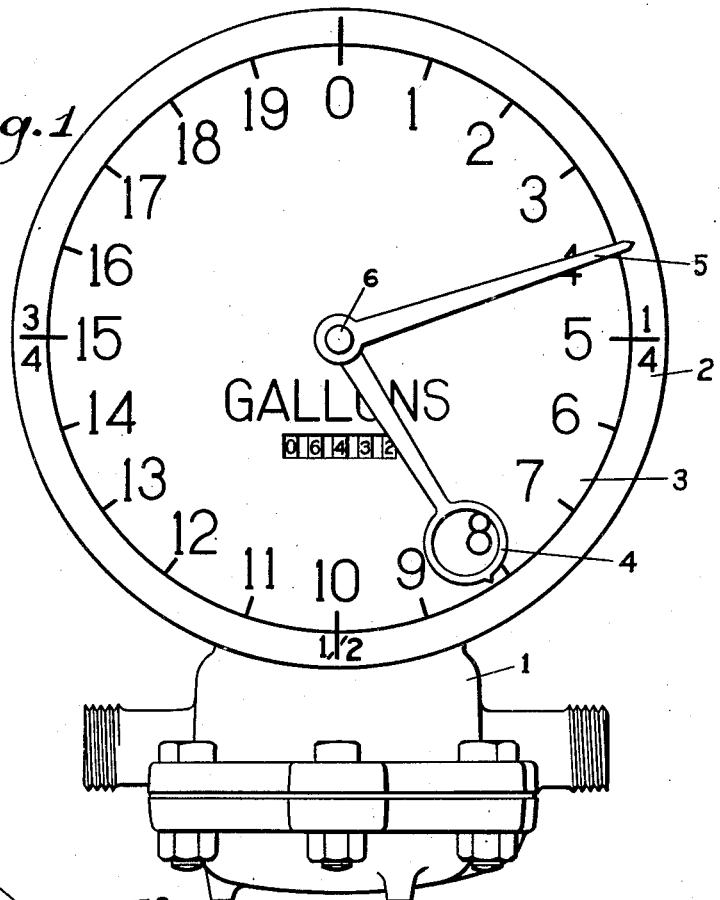

Patented Oct. 15, 1929

1,731,323

UNITED STATES PATENT OFFICE

EARL R. RYDER, OF BUFFALO, NEW YORK, ASSIGNOR TO CHARLES K. BASSETT, OF BUFFALO, NEW YORK

LIQUID METER

Application filed February 24, 1928. Serial No. 256,608.

The general objects of the invention are to provide a liquid meter or measuring device having an indicating mechanism especially suitable for use in retailing varying quantities of the liquid to be measured, and to provide a method whereby the sales value of such varying quantities can be easily, accurately and quickly determined.

In the accompanying drawings Figure 1 is a vertical view of the liquid meter, facing the dial face of the indicating mechanism. The inlet and outlet openings are not restricted to the exact form shown and either of them may be in either part of the outer casing.

Figure 2 is one of a series of computing charts from which readings of the sales price of the liquid delivered are obtained by selecting the proper value as indicated by the indicating mechanism of the meter.

In Figure 1, 1 is the measuring device which may consist of an outer casing of the usual type and an interior measuring chamber of the usual type, though the exact form of this measuring device is not limited in any way except that it is a device which measures the flow of liquid through it with a reasonable degree of accuracy.

2, is the indicating mechanism which is connected to the measuring device 1, by means of a series of shafts and gears of the usual type of which there are many variations. The essential feature of indicating mechanism 2, is that it has indicating dial 3, with graduations from which meter readings are obtained. These readings are taken from hand 5, which makes 1 revolution for a relatively small quantity of liquid such as 1 gallon and hand 4, which makes one revolution for a relatively larger quantity of liquid such as 20 gallons. Dial 3, may be graduated differently than the exact graduation shown however, without changing the basic idea of my invention. Hands 4 and 5, are set at the zero mark at the top of the register by a suitable device which in the drawing is shown as set back knob 6, though this construction may have several variations.

When the flow of liquid is to be started through the measuring device 1, hands 4 and 5 are set at zero, and as the quantity of liquid to be measured passes through measuring device 1, hands 4 and 5 move over dial 3, and at the end of the desired flow, hands 4 and 5 have been moved by the transmitted motion from measuring device 1, into the positions in which they indicate the amount of liquid which has passed through the meter since they had been set back to zero.

In Figure 1, the hands read 8 and 4/20 gallons. The fractions of a gallon are read directly from the figures given as the inner circle on dial 3 is graduated into 20 parts and hand 5, makes one complete revolution for one gallon in the exact construction shown. The meter is read in the same manner as a clock, and further explanation is not necessary.

If the liquid to be measured is gasoline with a value of 21¢ per gallon, a price chart based on a price of 21¢ per gallon is placed near the meter at a point where it can be viewed easily. The position of hand 4, at "8" causes the operator of the meter to select values on the horizontal line marked "8" at the left hand end. For the fraction of a gallon in twentieths, the reading is taken by moving along this line horizontally toward the right, until the figure directly under the "4" at the top of the chart is reached. In this manner, the reading on the chart is determined by the position of the two hands, and the value of the liquid which has just passed through the meter can be determined very accurately.

My invention is a great improvement over the former method of construction where readings were taken from the position of one hand only. It has not been possible to mark on the dial, graduations legible from a distance, and yet sufficiently fine, so that the value of the liquid could be determined from one hand within 1 cent per gallon at the present prevailing gasoline prices of 13 to 27¢ per gallon. Attempts have been made to place around the periphery of the dial the sales prices for the different quantities, but because of the limited space the steps between the different prices have been considerably greater than one cent. In addition to this, when readings are taken from only one hand, the movement of the hand throughout its rotation of one revolution must be in exact proportion to the flow of liquid through the measuring device. In actual practice however, slight inequalities in the gear teeth cause very slight errors in the motion of the hand, and if the path of the 20 gallon hand 4, were divided into very fine graduations, so that readings could be taken within 1¢, the position of the hand at any one point would not be correct, within such a close degree of accuracy.

In my invention, the position of either hand may be out 1/16" without introducing any error, as the graduations which determine the readings within 1¢ are over 1/2" apart. In my invention there is as much difference between obtaining accurate readings, as compared with previous devices, as there is in reading the time on a clock of the usual construction with two hands as compared with trying to read the time in minutes on a clock fitted with only one hour hand, and making one revolution every 12 hours.

The drawing shows in Figure 2 only one of a series of charts and it would be necessary to have a price chart for each of the values per unit of volume at which the liquid would be sold. When the meter is used for retail sales of gasoline, the series of price charts would probably be by 1¢ steps from 13¢ to 27¢, though in states where there is a tax on the gasoline, a slightly greater number of cards would be necessary per set, in order to give readings for gasoline prices for fractions of a cent.

Having described the invention I claim as new and desire to secure by Letters Patent:

A liquid dispensing device comprising a liquid meter, a meter dial having a series of numbered graduations, two meter indicating hands adjacent to said numbered graduations, and a price chart with tabulated computed prices arranged in a plurality of columns designated by numbers corresponding to said numbered graduations on said meter dial, substantially as and for the purpose described.

EARL R. RYDER.